United States Patent
Heinonen et al.

(10) Patent No.: US 6,633,758 B1
(45) Date of Patent: Oct. 14, 2003

(54) METHODS AND DEVICES FOR OPERATIONAL MODES IN COMMUNICATION DEVICES BEING MODIFIED WITH APPLICATION SPECIFIC PARAMETERS AND OPERATIONAL MODES AUTOMATICALLY LAUNCHING APPLICATIONS OR COMMANDS

(75) Inventors: Eeva-Liisa Heinonen, Tampere (FI); Jaakko Itävaara, Kirkkonummi (FI); Heidi Karves, Tampere (FI); Kai Kronström, Tampere (FI); Kari Lehtinen, Tampere (FI); Jari Mononen, Ruutanan (FI); Petri Nykänen, Tampere (FI); Mikko Virtanen, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/441,052

(22) Filed: Nov. 16, 1999

(51) Int. Cl.⁷ .................................................. H04Q 7/32
(52) U.S. Cl. ...................................... 455/418; 455/550
(58) Field of Search .................. 455/550, 418, 455/557, 558, 559

(56) References Cited

U.S. PATENT DOCUMENTS 5,842,124 A * 11/1998 Kenagy et al. ............. 455/418
5,873,037 A * 2/1999 Zicker et al. ............... 455/450
5,911,121 A * 6/1999 Andrews .................... 455/418
6,269,254 B1 * 7/2001 Mathis ....................... 455/557
6,308,061 B1 * 10/2001 Criss et al. ................. 455/418
6,314,285 B1 * 11/2001 Isberg et al. ............... 455/418
6,418,309 B1 * 7/2002 Moon et al. ................ 455/418
6,434,364 B1 * 8/2002 O'Riordain ................ 455/67.1

* cited by examiner

Primary Examiner—William Trost
Assistant Examiner—Andrew T Harry
(74) Attorney, Agent, or Firm—Antonelli, Terry, Stout & Kraus, LLP (57) ABSTRACT

Methods and devices for modifying operational modes in a communication device based on application specific parameters. The operational modes of the communication device are modified by adding the application specific parameters of the application to the operational modes of the communication device. Further, commands may be automatically launched after an operational mode change in a communication device. One or more commands to be automatically launched when an operational mode becomes a current operational mode currently used by the communication device are entered into the operational mode of a communication device of a user. Whether the current operational mode has any commands to be automatically launched is determined. The one or more commands are automatically launched if the current operational mode has any commands to be automatically launched.

5 Claims, 5 Drawing Sheets

FIG. 1
(PRIOR ART)

| PARAMETER | PARAMETER VALUES |
|---|---|
| ALL ALERT TONES | RINGING |
| | ASCENDING |
| | RING ONCE |
| | BEEP ONCE |
| | SILENT |
| RINGING TONE | DEFAULT TONE |
| | CHARLESTON |
| | CITY BIRD |
| RINGING VOLUME | LEVEL 1 |
| | LEVEL 2 |
| | LEVEL 3 |
| | LEVEL 4 |
| DIVERT ALL VOICE CALLS | TO: ________ |
| | TO: VOICE MAILBOX |
| | TO: DEFAULT DIVERTS |
| PHONE KEY CLICK | OFF |
| | LEVEL 1 |
| | LEVEL 2 |
| | LEVEL 3 |

S1: COMMANDS TO BE AUTOMATICALLY LAUNCHED ENTERED INTO OPERATIONAL MODES OF COMMUNICATION DEVICE

S2: DETERMINE IDENTITY OF CURRENT OPERATIONAL MODE

S3: CURRENT OPERATIONAL MODE CONTAINS COMMANDS TO BE AUTOMATICALLY LAUNCHED? — NO → (back to S2) / YES ↓

S4: LAUNCH AND/OR ACTIVATE COMMANDS

FIG. 5

METHODS AND DEVICES FOR OPERATIONAL MODES IN COMMUNICATION DEVICES BEING MODIFIED WITH APPLICATION SPECIFIC PARAMETERS AND OPERATIONAL MODES AUTOMATICALLY LAUNCHING APPLICATIONS OR COMMANDS

BACKGROUND OF THE INVENTION

1. Field of the Invention

This invention relates to operational modes in communication devices, and more specifically to adding application specific parameters to operational modes in communication devices, and launching commands based on the current operational mode of the communication device.

2. Background and Material Information

Conventional communication devices, such as phones, portable computers, Personal Communicators, Smart Phones, etc., may have information stored in operational modes in the devices that relate to settings of the devices. Currently, operational modes are used in communication devices to control several parameters or parameter values at one time. If the communication device is a mobile phone, these parameters may include, for example, ringing tone, volume, message alert tone, etc. The parameters control settings of the mobile device. Operational modes contain sets of parameter settings such that by using a specific operational mode, several parameters and/or parameter values are automatically set. Currently, the number of parameters in a particular operational mode may be pre-set. Therefore, the user cannot add or delete any parameters from the set included in the operational mode.

EP 0 611 070 discloses a portable phone whose phone settings are stored in groups (modes) so that the user, when switching from one group to another, can switch several settings at a time. A single operation by the user may set the ringing strength, loudspeaker volume, display light, etc. FIG. 3 of EP 0 611 070 shows the relationship between operating characteristics (e.g., sound volume, ringing tone, lights, etc.) and defined groups (e.g., indoors, outdoors, conference, etc.).

EP 0 865 188 discloses portable phones that may have various modes or profiles that can be selected manually, or automatically in response to the phone's surroundings based on a sensed control parameter. The profiles are located in the portable phone, and each profile may define multiple settings for the phone or user.

Figure 1:
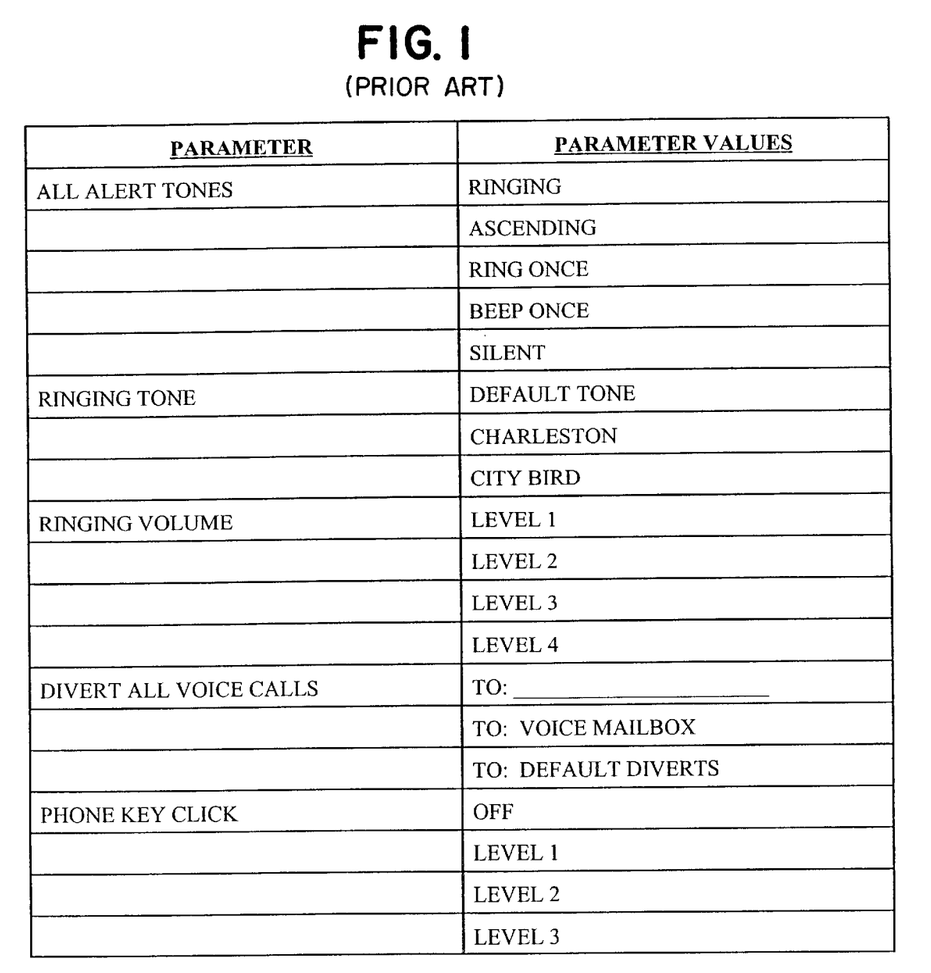
FIG. 1 is a table of some example parameters and parameter values that may exist in an operational mode of a communication device.

FIG. 1 shows a table of some example parameters and parameter values that may exist in an operational mode of a communication device that is a communicator. The first column of the table shows the name of the parameter. As shown, the parameters in the operational mode of a communicator may include parameters such as alert tones, ringing tone, ringing volume, voice call diversion, or phone key click. The second column in FIG. 1 shows the possible values for each parameter. For example, the ringing volume parameter may be set to any one of levels 1 through 4. Currently, a user of a communication device, such as this, may select from the parameter values for a particular parameter, however, the user may not be able to get new parameters or parameter values included in an existing operational mode of the communication device.

In the past, communication devices have had limited capability, and not many additional applications have been available. Therefore, communication devices only needed a few operational modes with only a few parameters in each. For example, Nokia 6110-series mobile phones have only a couple of different parameters for volume control (incoming call alert, incoming message alert, warning and game tones, etc.) which appeared to be sufficient. Today, communication devices have increased capability, and many more applications are available for installation into communication devices that add even more capability. Forthcoming communication devices may offer many more possibilities for additional software and features.

SUMMARY OF THE INVENTION

Accordingly, the present invention is directed to a method for setting application specific operational mode parameters in operational modes of communication devices that substantially obviates one or more of the problems arising from the limitations and disadvantages of the related art.

One aspect of the present invention is directed to a methods and devices for modifying operational modes in a communication device based on application specific parameters. The operational modes of the communication device may be modified by adding the application specific parameters of an application to the operational modes of the communication device.

Whether the operational modes of the communication device may be modified is determined. The determining may include the application querying a profile management application whether the operational modes of the communication device may be modified. The determining may include querying the application by a profile management application whether the application has modifications for the operational modes of the communication device.

The application may be installed in the communication device prior to or currently with the modifying of the operational modes of the communication device. The modifying the operational modes may include adding associated default values of the application specific parameters to the operational modes. Standard operational mode parameters in the application may be recognized and default values automatically set for the standard operational mode parameters (e.g. in new operational modes). The standard operational mode parameters being recognized by a profile management application.

The application may communicate with a profile management application. The profile management application may perform the modifying of the operational modes of the communication device. The application and the profile management application may communicate through at least one Application Program Interface (API). A profile action API may enable the profile management application to pass commands to the application according to parameters. It also may enable the application to pass commands to the profile manager application to set a new active profile. A profile action API may enable the application to select a new operational mode when the application becomes active. A profile variable API may enable the adding of the application specific parameters of the application and their associated default values to the operational modes.

Less than all of the operational modes of the communication device may be modified. The communication device may be a mobile device. The mobile device may be a wireless mobile phone. The mobile device may be a Personal Communicator. The mobile device may be a portable computer. The mobile device may be a Smart Phone.

A further aspect of the present invention is directed to a method for forming new operational modes in a communication device that includes installing an application in the communication device and creating at least one new operational mode for the communication device based on the application. The new operational mode may be formed by adding application specific parameters to the at least one new operational mode, adding existing parameters from existing operational modes to the at least one new operational mode, or by adding application specific parameters and adding existing parameters from existing operational modes to the at least one new operational mode.

The modification of the operational modes may be performed automatically by the communication device.

Another aspect of the present invention is directed to methods and devices for launching commands after an operational mode change. At least one command to be automatically launched when the at least one operational mode becomes a current operational mode currently used by the communication device may be entered into at least one operational mode of a communication device of the user. Whether the current operational mode has any at least one command to be automatically launched may be determined. The at least one command may be launched automatically if the current operational mode has at least one command to be automatically launched.

A command may be launched that causes information to be sent to a network conveying that the application is active in the communication device. The entering, and determining may be performed by a profile manager of the communication device.

A communication device may have at least one operational mode that controls settings of the communication device. The communication device may have a process for modifying operational modes in the communication device based on application specific parameters. The operational modes of the communication device may be modified. The operational modes may be modified by adding the application specific parameters of the application to the operational modes of the communication device. Specific operational mode parameter default values for the application may be automatically set when the application becomes active.

A communication device may have at least one operational mode that controls settings of the communication device. The communication device may have a process for launching commands after an operational mode change. At least one command to be automatically launched when the at least one operational mode becomes a current operational mode currently used by the communication device may be entered into at least one operational mode of a communication device of the user. Whether the current operational mode has any at least one command to be automatically launched may be determined. The at least one command may be launched automatically if the current operational mode has at least one command to be automatically launched.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows in reference to the noted plurality of drawings by way of non-limiting examples of preferred embodiments of the present invention in which like reference numerals represent similar parts throughout the several views of the drawings and wherein.

DETAILED DESCRIPTION OF THE PREFERRED EMBODIMENTS

The particulars shown herein are by way of example and for purposes of illustrative discussion of the embodiments of the present invention. The description taken with the drawings make it apparent to those skilled in the art how the several forms of the present invention may be embodied in practice.

According to the present invention, specific parameters that relate to an application are allowed to be added to the existing operational modes of a communication device. Communication devices include many types of devices, such as, for example, wireless phones, Personal Communicators, Smart Phones, and portable computers. The application specific parameters are added to the existing operational modes of the communication device during the installation of the application in the communication device.

New parameters may be created by modifying existing parameters. This new parameters may then be added to a new operational modes. Further, default values of existing parameters may be modified and added to new operational modes.

Each application may have parameter settings that are customized for the application. These application specific parameter settings may be the same as existing parameters, or different from those that may currently exist in the operational modes of the communication device. By adding parameters to operational modes of the communication device, anytime the application is active or being used in the communication device by the user, the communication device uses the application specific parameters in whichever operational mode is currently being used. Therefore, the user does not have to manually adjust or set the parameters for the current operational mode each time the user activates or uses the application. Further, the application settings do not have to be changed to fit the current operational mode.

The present invention will be illustrated using an exemplary embodiment of the communication device being a mobile device such as a wireless mobile phone. However, the present invention is not limited by this embodiment, and is meant to cover all embodiments of methods and devices related to communication devices, mobile or not, that are within the spirit and scope of the present invention.

Figure 2:
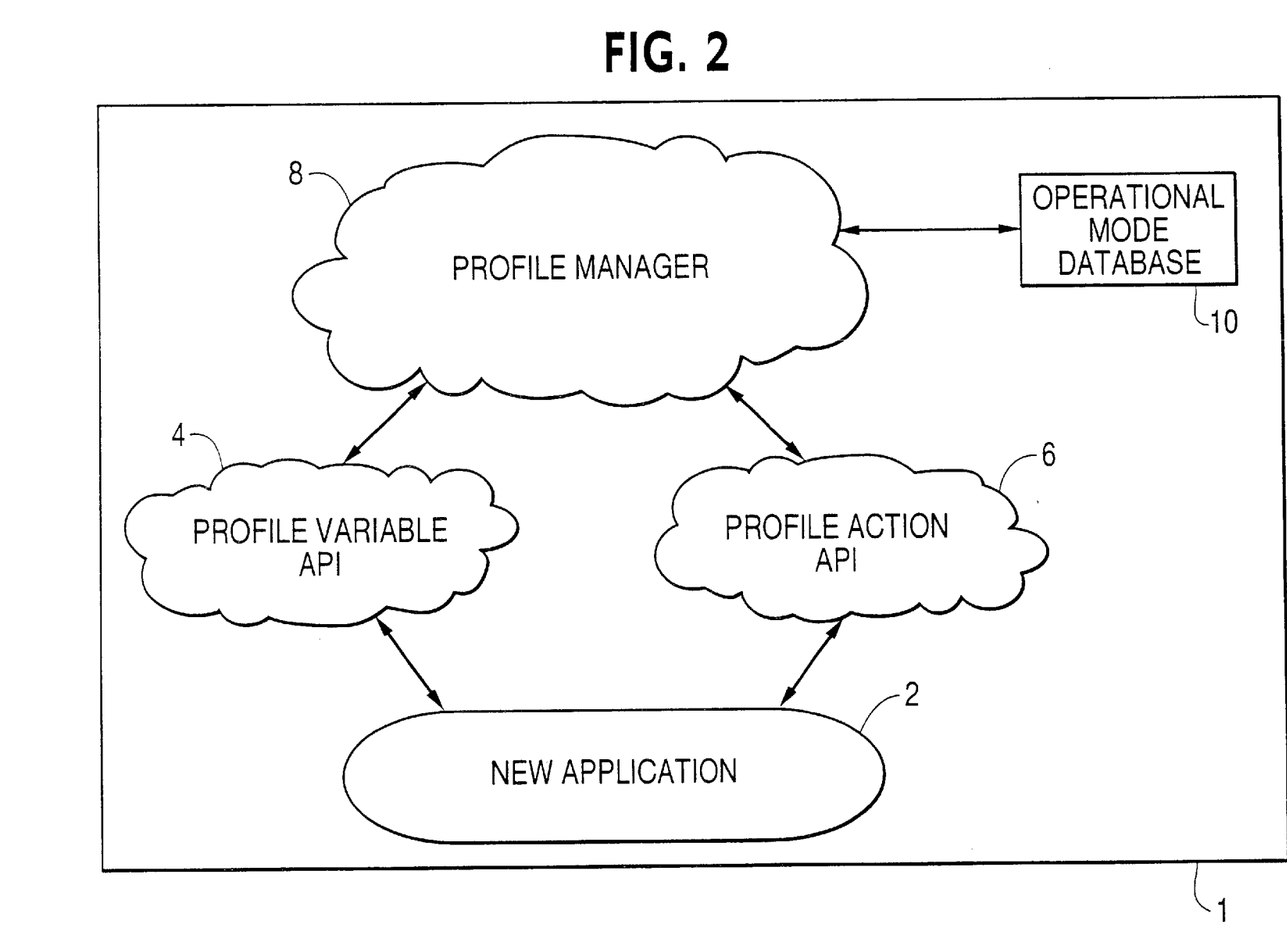
FIG. 2 is a diagram of a communication device with a new application and its interfaces with a profile manager according to the present invention.

FIG. 2 is an exemplary system diagram of a mobile device 1 with a new application and its interfaces with a profile manager according to the present invention. The new application 2 may use two Application Programming Interfaces (APIs) 4, 6 to interface with a profile manager 8. Profile manager 8 may be a software application or a combination of software and hardware. Profile manager 8 controls access to an operational mode database 10 that contains the operational modes for the mobile device. The profile variable API 4 may be used by new application 2 to send requests and information to profile manager 8. New application 2 may use profile variable API 4 to determine if new parameters can be added to the operational modes of the mobile device, and also to send the parameters to profile manager 8 so that they can be added to the operational modes in operational mode database 10. Profile action API 6 may be used by profile manager 8 to communicate to application 2 what current operational mode is being used in the mobile device. Profile action API 6 may also be used to communicate the possible actions/commands that the selected operational mode contains (e.g., a command that tells the application to "send device name and current operational mode name to server XYZ"). Further, profile action API 6 may enable a new operational mode to be selected by an application when the application is activated. These communications may occur between profile manager 8 and all applications, just active applications, or just applications that may be affected by the current operational mode.

Figure 3:
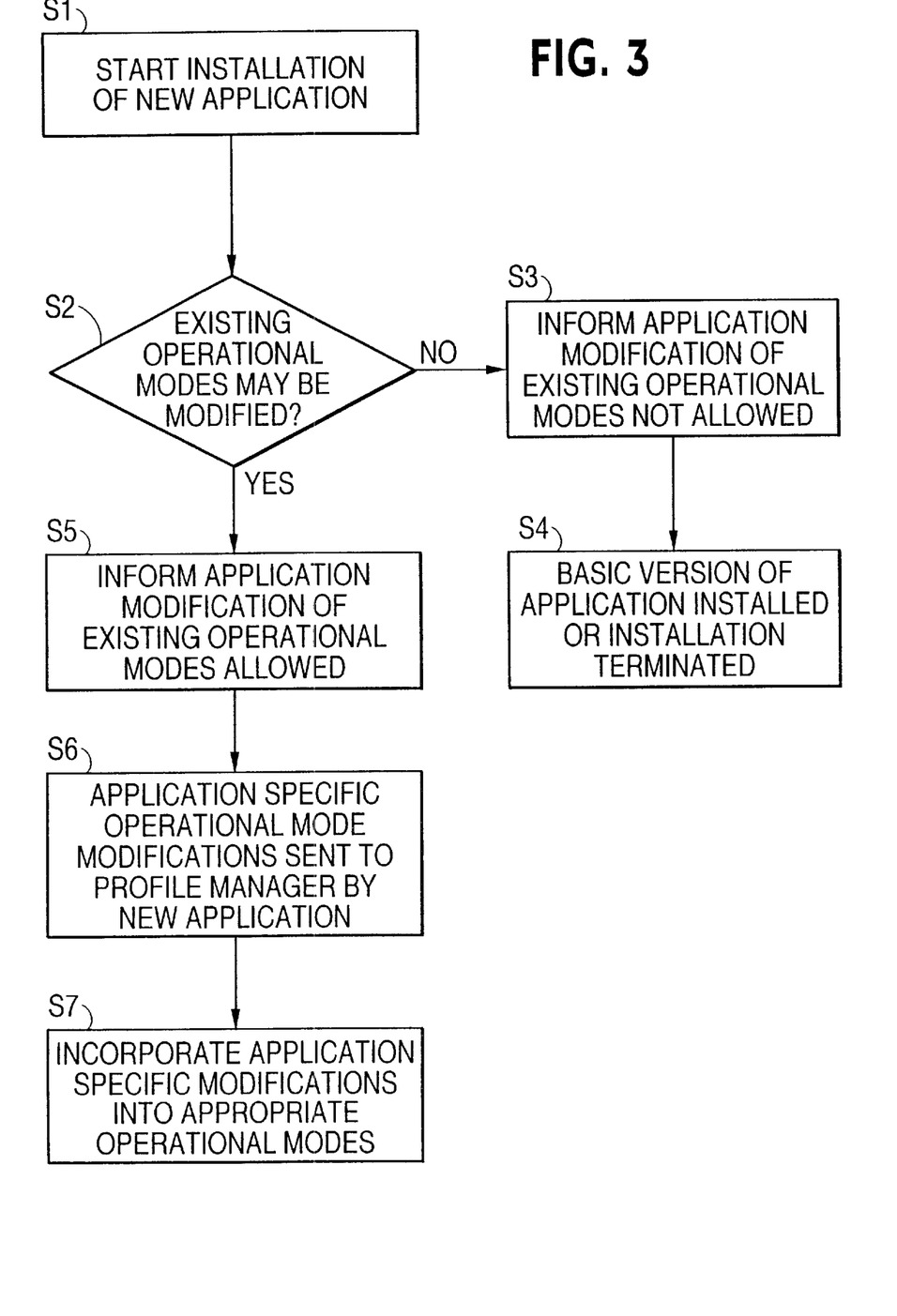
FIG. 3 is a flowchart of an exemplary process for setting application specific parameters in operational modes of communication devices according to the present invention.

FIG. 3 is a flowchart of an exemplary process for setting application specific operational mode parameters in operational modes of communication devices according to the present invention. Again using the mobile device embodiment, a user may want to add a new application to a mobile device. The appropriate hardware connections are made to allow installation of the new application. The hardware connection may be any of many known methods for downloading or installing applications (e.g., a connection between the mobile device and a computer).

The installation of the new application is started (S1). The profile manager determines whether the existing operational modes may be modified (i.e., new parameters added to the existing operational modes of the mobile device) (S2).

In some cases, the existing operational modes may not be modifiable (e.g., parameters cannot be added). For example, the current operating system and/or operational modes in the mobile device may be so old that the application specific parameters are not compatible with them. Further, the manufacturer of the mobile device and/or profile manager may have designed the operational modes in the mobile device to not support adding of new parameters and, therefore, application specific parameters from new applications will not be allowed to be added to the existing operational modes. Also, there may be limited space in the existing operational modes where there is no room to add additional parameters. If the operational modes are not allowed to be modified, the profile manager will inform the new application of this fact (S3). The new application may then allow installation of just a basic version of the application, or terminate the installation (S4).

If modification of existing operational modes is allowed, the profile manager may inform the new application of this (S5). The new application may then use the profile variable API to send to the profile manager the application specific operational mode modifications (i.e., new parameters to add, or parameters to add that are modifications of existing parameters) (S6). This may also include adding associated default values of the application specific parameters to the operational modes. Further, the profile manager may recognize standard operational mode parameters in the application and automatically set defaults for the standard operational mode parameters. The profile manager then may incorporate these application specific modifications in some or all of the existing operational modes in the mobile device (S7).

There may be cases where the application specific modifications are only to be incorporated into certain existing operational modes, and not all of them. In this situation, the new application may also send the profile manager information regarding which existing operational modes of the mobile device should have the application specific modifications incorporated into them. The application specific modifications may be added to the existing operational modes of the mobile device concurrently with the installation of the new application in the mobile device.

Moreover, according to the present invention, installation of a new application may initiate the creation of a new operational mode. The new operational mode may be formed from new application specific parameters being added to it, formed from existing parameters from existing operational modes being added to it, or formed from a combination of new and existing parameters being adding to the new profile. Further, modification of operational modes, and creation of new operational modes may be performed automatically upon the installation of a new application.

By importing the modified or new parameters to the profile manager, the application may be allowing the profile manager to control it to some extent. For example, this may allow the profile manager to control parameters such as volume (e.g., game sounds if the application is a game), the screen, or the user interface when the application is active or being used. Instead of the program manager managing the modification of parameter values, the modified or added operating parameters may be set only in the application they were installed with, not in the operational modes/menu settings in the operating system. Each application may have a settings view, which may be used for setting the parameters to preferred values from the available parameter values. The changed parameter value would be saved for the currently active operational mode. For example, when the user wants to set the game tones to off when in a meeting, the "meeting" operational mode should be set as the current operational mode, and the settings changed in the game application. The next time the "meeting" operational mode is the current operational mode, the game tones may be automatically set to off.

The application specific parameters may be presented in a separate view of the operational modes settings. The user would not see them in normal usage, but only when specifically needed, e.g., when a specific application or operational mode becomes active.

Also, the total number of application specific parameters may be limited to a set number (e.g., 0<20) by the communications device.

Instead of the new application sending a query to the profile manager whether new parameters may be added to the existing operational mode of the communication device, the profile manager may query the new application whether the new application has any new parameters. If the new application has new parameters, the profile manager may then fetch the new parameters from the application.

According to the present invention, the user may configure different applications with the user's own parameter values to better fit the user's needs in each operational mode. One useful example is sound. In some cases, controlling all device sounds with one value is not enough. Some applications may want to push their warning or alert tones even though the communication device is in a current operational mode where sounds are set to be silent. Also, some sounds may be turned off even though some other sounds are enabled. For example, in a "meeting" operational mode, where incoming calls may be signaled with a small beep, specific game or E-mail sounds may be turned off, but some warning tones may still be enabled.

Controlling incoming messages and calls may also be personalized. An additional feature in the application in the communication device might recognize urgent messages, and allow only the urgent messages to be alerting while the communication device is in a "meeting" operational mode. With partial control of the screen of the communication device, E-mails sent with high importance and received by the communication device, may be shown directly on the screen of the communication device, even though some other application may be active.

In a certain operational mode, an application may be given a permission to always control a certain area of the screen. For example, in a "meeting" operational mode it may be useful to see all SMS messages on top of the screen, no matter what application is running. On the other hand, in a "normal" operational mode this would not be practical, as it decreases the screen area available. Further, once a certain operational mode is selected, an application that controls the screen and presents messages may be automatically launched. For example, in a certain operational mode, a parameter "enable screen control to application A" may be set to "ON", therefore allowing the application A to present a SMS or high importance e-mail to the screen.

According to the present invention, commands may be activated upon changing from an existing current operational mode to a new current operational mode (i.e., when a new operational mode is selected to replace the currently used operational mode). For example, if the operational mode of the communication device is currently set to "normal", and then the user desires to play a game, the user may change the operational mode to "game". Once the operational mode has been changed to "game", a particular game is launched and/or activated. The particular game launched may have been previously setup in a "game" operational mode. Therefore, the user, once changing the operational mode to "game", does not have to then activate the game application since it may be activated automatically upon selection of the "game" operational mode. If the user decides that the next time the operational mode is changed to "game", a different game is desired, the user may enter the different game information into the "game" operational mode (e.g., =set the value to game1 or game2). There may be one parameter in the operational mode for each application that contains the information to launch the particular application through the profile action API. However, the operational mode may have several parameters, one for each application, that may cause the launching of several commands simultaneously upon the selection of this particular operational mode as the current operational mode of the communications device. Further, these commands may cause the launching of several applications simultaneously.

Figure 4:
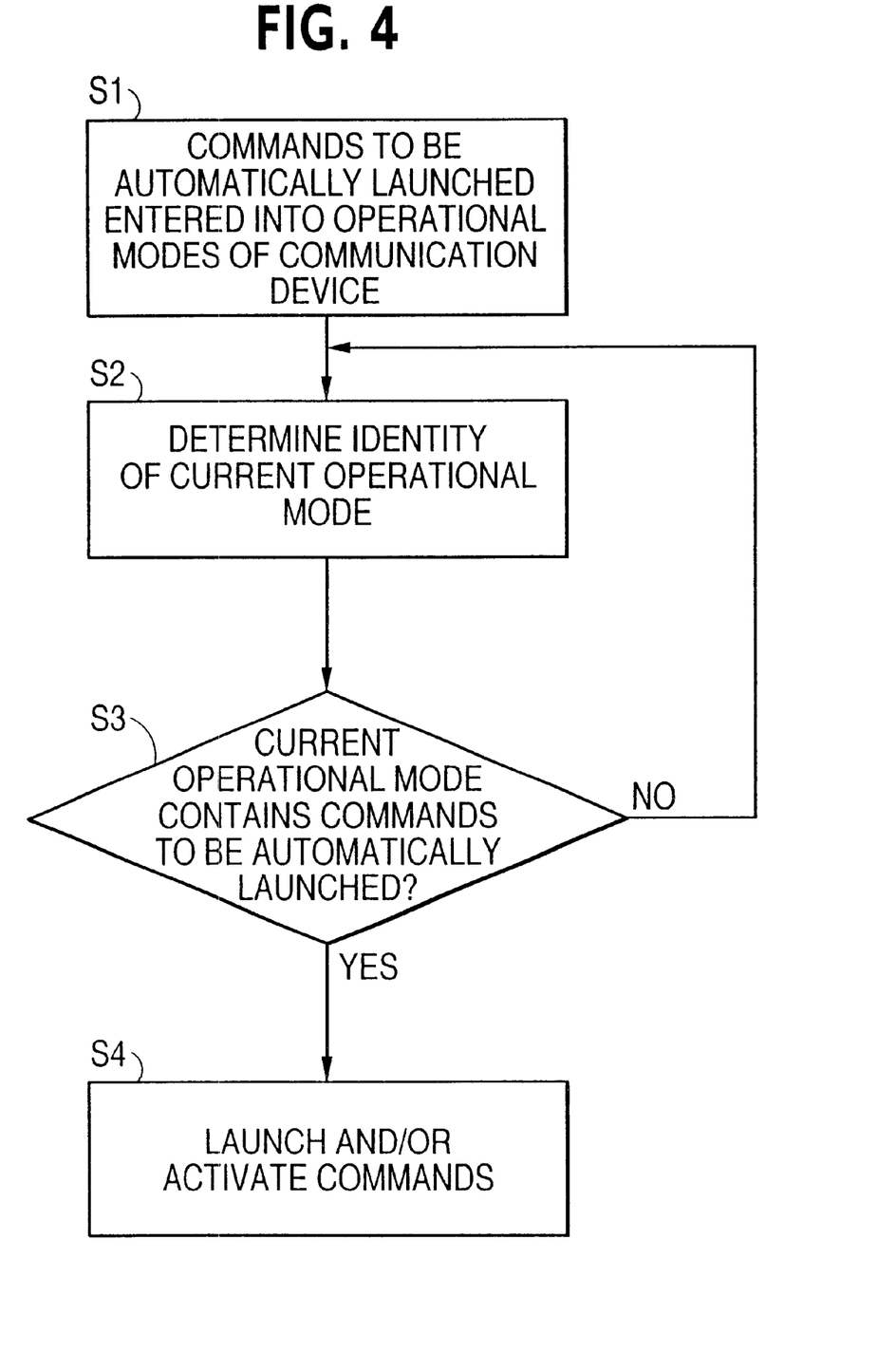
FIG. 4 is a flowchart of an exemplary process for launching commands due to the current operational mode of a communication device according to the present invention.

FIG. 4 is a flowchart of an exemplary process for launching commands based on the current operational mode of a communication device. The user enters into the operational modes commands, for each operational mode, to be automatically activated when the operational mode becomes the currently used operational mode (current operational mode) of the communications device (S1). The profile manager identifies the current operational mode (S2), and then determines whether this current operational mode has commands that should be automatically launched and/or activated (S3). If so, the operating system of the communication device launches and/or activates the commands (S4). If the current operational mode does not have commands that should be automatically launched and/or activated, the operating system resumes monitoring the identity of the current operational mode to detect a change (S2).

Figure 5:
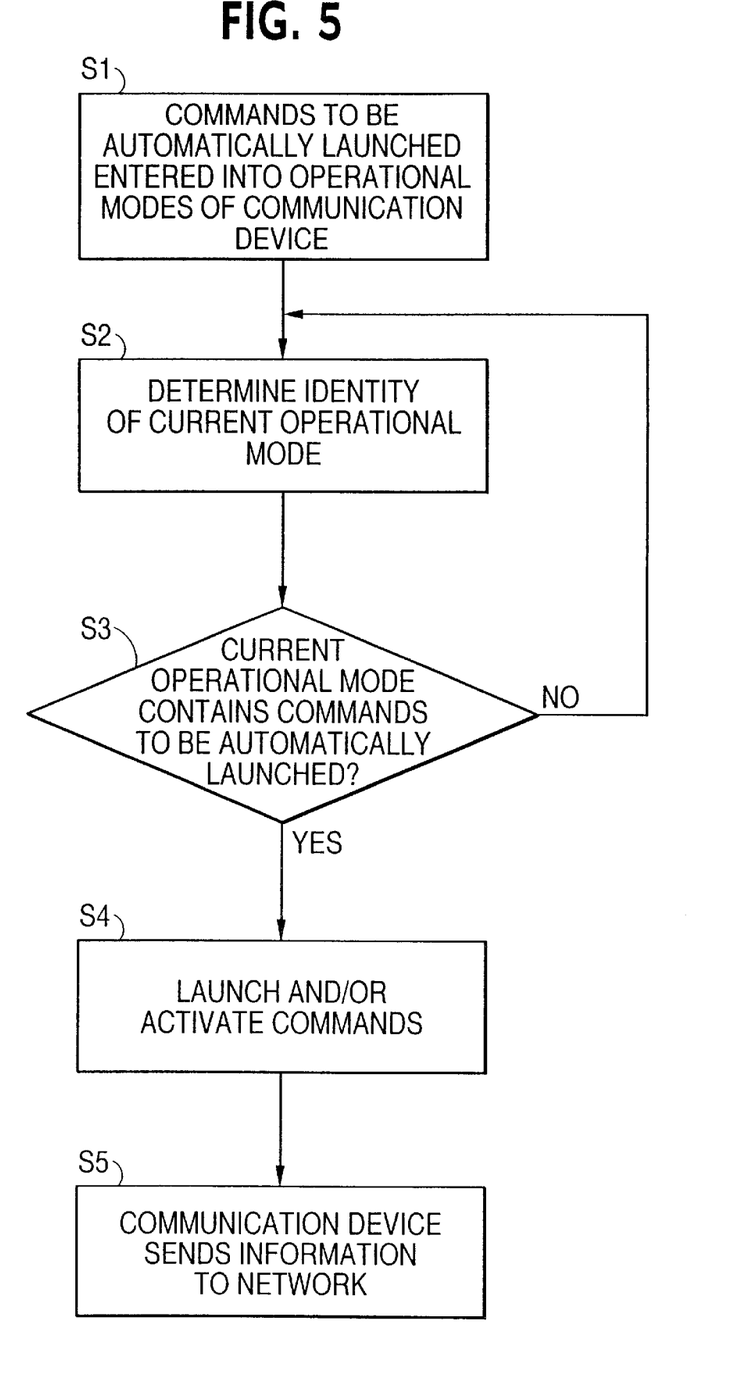
FIG. 5 is a flowchart of an exemplary process for a launched command that causes a communication device to send information to a network based on a particular operational mode being the current operational mode according to the present invention.

Further, using the exemplary embodiment of the game application, the game application may also automatically cause the communication device to send information to a network that the game application is active in the communication device, and/or that the user is ready to play the game. This information may be sent during the launching of the application. FIG. 5 is a flowchart of an exemplary process for a launched command that causes a communication device to send information to a network based on a particular operational mode being the current operational mode of the communication device and containing commands causing the communication device to automatically send the information to a network as soon as the particular operational mode becomes the current operational mode of the communication device.

The user enters into the operational modes specific commands, for each operational mode, to be activated when the operational mode becomes the current operational mode of the communications device (S1). The profile manager identifies the current operational mode (S2), and then determines whether this current operational mode has commands that should be automatically launched and/or activated (S3). If so, the operating system of the communication device launches and/or activates the commands (S4). The operating system executes commands causing the communication device to send information to a network (S5). The information may be related to the current operational mode, applications launched based on the current operational mode, or user information based on the current operational mode. If the current operational mode does not have commands that should be automatically launched and/or activated, the operating system resumes monitoring the identity of the current operational mode to detect a change (S2).

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed:

1. A method for automatically launching at least one command specified by a user for starting at least one application after an operational mode change in a communication device comprising:

entering into at least one operational mode of a communication device of a user at least one command specified by the user for starting at least one application to be automatically launched when the at least one operational mode becomes a current operational mode currently used by the communication device;

determining whether the current operational mode has any at least one said command to be automatically launched; and launching the at least one said command automatically if the current operational mode has any at least one command to be automatically launched.

2. The method according to claim 1, wherein the launched at least one command causes information to be sent to a network conveying that the application is active in the communication device.

3. The method according to claim 1, the entering, and determining being performed by a profile manager of the communication device.

4. The method according to claim 1, the communication device comprising a mobile device.

5. The method according to claim 4, wherein the mobile device comprises at least one of a wireless mobile phone, a Personal Communicator, a portable computer, and a Smart Phone.

\* \* \* \* \*